US008566632B2

(12) United States Patent
van de Burgt et al.

(10) Patent No.: US 8,566,632 B2
(45) Date of Patent: Oct. 22, 2013

(54) MULTI-RATE SAMPLING FOR NETWORK RECEIVING NODES USING DISTRIBUTED CLOCK SYNCHRONIZATION

(75) Inventors: Rolf van de Burgt, Oosterbeek (NL); Bernd Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 373 days.

(21) Appl. No.: 13/008,513

(22) Filed: Jan. 18, 2011

(65) Prior Publication Data

US 2012/0185721 A1   Jul. 19, 2012

(51) Int. Cl.
*G06F 1/12* (2006.01)
*G06F 1/00* (2006.01)
*G06F 1/04* (2006.01)
*G06F 15/16* (2006.01)

(52) U.S. Cl.
USPC ........... 713/400; 713/501; 713/600; 709/233; 709/248

(58) Field of Classification Search
None
See application file for complete search history.

(56) References Cited

U.S. PATENT DOCUMENTS

| | | | |
|---|---|---|---|
| 6,604,203 B1* | 8/2003 | Mu et al. ...................... | 713/400 |
| 2004/0044919 A1* | 3/2004 | Dabral ......................... | 713/400 |
| 2005/0141565 A1* | 6/2005 | Forest et al. ................. | 370/503 |
| 2010/0210234 A1* | 8/2010 | Hyde et al. .................. | 455/272 |

* cited by examiner

*Primary Examiner* — Ji H Bae

(57) ABSTRACT

Various embodiments relate to a network receiver using distributed clock synchronization. The network receiver may include a first timing engine that samples bits received by the receiver with a first clock having a first clock frequency ($f_1$) with a first clock frequency tolerance ($\Delta f_1$), and a second timing engine that samples bits received by the receiver with a second clock having a second clock frequency ($f_2$) with a second clock frequency tolerance ($\Delta f_2$). The second clock frequency is less than the first clock frequency. The network receiver may also include a third timing engine that samples bits received by the receiver with a third clock having a third clock frequency ($f_3$) with a third clock frequency tolerance ($\Delta f_3$). The third clock frequency may be greater than the first clock frequency. The network receiver may also include a timing engine resolver that determines which of the first, second, and third timing engines correctly samples the bits received by the receiver; wherein $f_1-\Delta f_1 < f_2+\Delta f_2$; wherein $f_3-\Delta f_3 < f_1+\Delta f_1$.

17 Claims, 5 Drawing Sheets

MULTI-RATE SAMPLING FOR NETWORK RECEIVING NODES USING DISTRIBUTED CLOCK SYNCHRONIZATION

TECHNICAL FIELD

Various exemplary embodiments disclosed herein relate generally to multi-rate sampling for network receiving nodes using distributed clock synchronization.

BACKGROUND

Various communication protocols using distributed clock synchronization allow multiple master devices and slave devices to communicate over a bus in a communication network without clock signal. An internal clock base for the devices is extracted from the incoming data. As a result, internal clocks in the devices must be within a certain tolerance in order to correctly communicate over the bus. Such tolerance can be easily met by crystal oscillators. However, crystal oscillators may not be desirable to implement in all devices. For example, a network may include transceivers and small slave devices that need to be able to decode messages sent on the bus and then perform actions like waking up other devices. Such devices may be required to be low cost and to have low power consumption. Therefore, on-chip oscillators provide a solution to meet these requirements, however on-chip oscillators may not be able to meet the frequency tolerance requirements of the network, especially over a wide temperature range as may required in certain applications, as well as over the lifetime of the device.

In view of the foregoing, it desirable to develop an apparatus and method so that low cost and low power oscillators may be used in network devices, yet still meet the timing requirements in the communication network using distributed clock synchronization. Devices incorporating such low-cost and low-power oscillators could then be more widely deployed in networks.

SUMMARY

In light of the present need for an apparatus and method so that low-cost and low power oscillators may be used in network devices, yet still meet the timing requirements in the communication network using distributed clock synchronization, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments may relate to a network receiver using distributed clock synchronization that includes: a first timing engine that samples bits received by the receiver with a first clock having a first clock frequency ($f_1$) with a first clock frequency tolerance ($\Delta f_1$); a second timing engine that samples bits received by the receiver with a second clock having a second clock frequency ($f_2$) with a second clock frequency tolerance ($\Delta f_2$), wherein the second clock frequency is less than the first clock frequency; a third timing engine that samples bits received by the receiver with a third clock having a third clock frequency ($f_3$) with a third clock frequency tolerance ($\Delta f_3$), where the third clock frequency is greater than the first clock frequency; and a timing engine resolver that determines which of the first, second, and third timing engines correctly samples the bits received by the receiver; wherein $f_1 - \Delta f_1 < f_2 + \Delta f_2$; wherein $f_3 - \Delta f_3 < f_1 + \Delta f_1$.

Various embodiments may also relate to a method of receiving bits in a receiver in a network using distributed clock synchronization that includes: sampling bits received by the receiver with a first clock having a first clock frequency ($f_1$) with a first clock frequency tolerance ($\Delta f_1$); sampling bits received by the receiver with a second clock having a second clock frequency ($f_2$) with a second clock frequency tolerance ($\Delta f_2$), wherein the second clock frequency is less than the first clock frequency; sampling bits received by the receiver with a third clock having a third clock frequency ($f_3$) with a third clock frequency tolerance ($\Delta f_3$), where the third clock Frequency is greater than the first clock frequency; and determining which of the first, second, and third sampling steps correctly samples the bits received by the receiver; wherein $f_1 - \Delta f_1 < f_2 + \Delta f_2$; wherein $f_3 - \Delta f_3 < f_1 + \Delta f_1$.

BRIEF DESCRIPTION OF THE DRAWINGS

In order to better understand various exemplary embodiments, reference is made to the accompanying drawings wherein.

DETAILED DESCRIPTION

Figure 1:
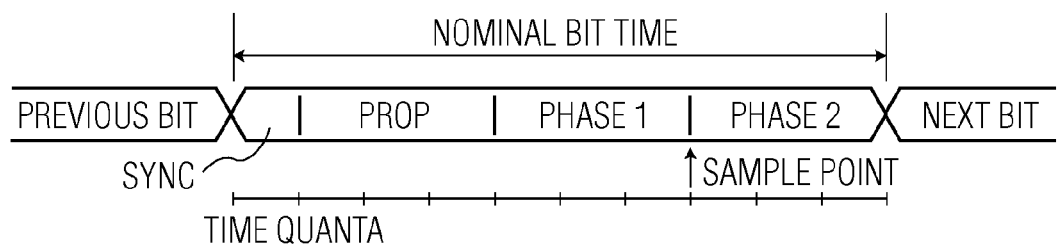
FIG. 1 illustrates exemplary bit time definitions in an serial communication protocol using distributed clock synchronization.

Referring now to the drawings, in which like numerals refer to like components or steps, there are disclosed broad aspects of various exemplary embodiments.

In order to facilitate the detailed description of the operation and the principles of the invention, an example network protocol will be used. That network protocol is the Controller Area Network (CAN, ISO 11898). CAN began as a vehicle bus standard designed to allow microcontrollers and devices to communicate with each other within a vehicle without a host computer. CAN is a message based protocol, designed specifically for automotive applications, but now is also used in other areas such as industrial automation and medical equipment.

The CAN physical layer does not have dedicated dock lines between communicating devices and receiving devices so these devices need to synchronize their sampling on the negative edges of the incoming data. Thus, CAN devices may communicate without a common clock signal. To achieve a reliable synchronization, there are strict requirements on the internal clock of the sending and receiving nodes. The following embodiment relaxes the requirements on the internal clock of the receiving nodes, allowing cost-effective solutions without use of crystal oscillators.

In CAN devices, the internal clock base is extracted from the incoming data. As synchronization occurs on negative edges of the bits, if a long string of the same value bit, for example 1's, are received, there is no negative edge to allow synchronization to occur. In order to limit the number of bits received before synchronization occurs, the CAN protocol uses bit stuffing. The CAN bit stuffing rule allows, at most, 5 consecutive bits with the same polarity, thus assuring that there are enough polarity changes in the data to synchronize sufficiently. For example, when 5 bits identical bits in a row are received, a stuffing bit of the opposite value may be put into the bit stream in order to force a transition. Under this rule, a synchronization will occur within at least every 10 bits.

In CAN, a Nominal Bit Time (NBT) may be defined as illustrated in FIG. 1. In order to have a finer synchronization granularity than the NBT, Time Quantas (Tq) are defined. A CAN bit is divided in four segments as depicted in FIG. 1. These segments are related to the several physical delays in the system. The Sync segment may be the part of the bit time used to synchronize the various CAN devices on the bus. An edge may be expected within this segment. The Prop segment may be the part of the bit time used to compensate for physical delay times within the network. These delay times may consist of the signal propagation time on the bus and the internal delay time of the CAN receivers. The Phase 1 and Phase 2 segments may be used to compensate for edge phase errors. These segments may be lengthened or shortened by resynchronization. The data sampling point is the point of time at which the bus level is read and interpreted as the value of that respective bit. The data sampling point is defined as the transition from Phase 1 to Phase 2. However the receiver samples on each Tq. If a data edge is received in another segment than the Sync segment, the receiver's internal time base is shifted by X Tq, to align it with time base of the incoming data. The maximum time shift is defined by the Sync Jump Width (SJW) parameter. The NBT may be up to 25 Tq, while the SJW may be limited to 4 Tq.

Figure 2:
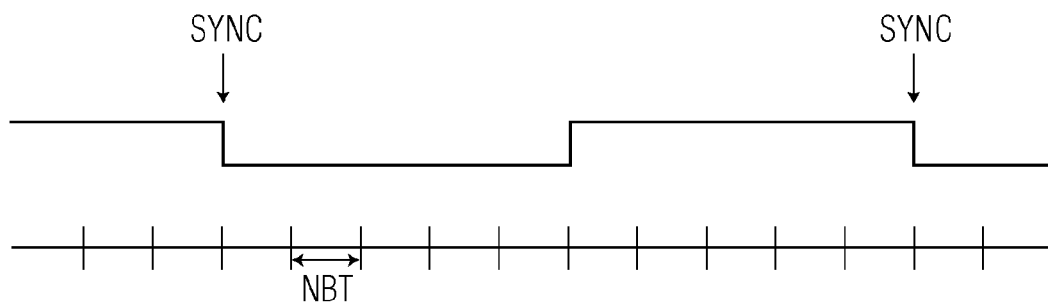
FIG. 2 illustrates an exemplary synchronization timing in a serial communication protocol using distributed clock synchronization.

As the time base is only synchronized on negative edges, in the worst case scenario, it may take 10 bits before the internal time base is re-synchronized, as depicted in FIG. 2. At the second synchronization moment, the phase error of the receiving node's internal time base should not deviate more than the SJW. If the negative edge does not occur before the sample point, the frame cannot be decoded, as the bit is sampled with the wrong polarity. Therefore, at the synchronization moment, the phase shift between sender and receiver shall not be more than the SJW (≤4 Tq); otherwise decoding will not be possible. To achieve this, the allowed receiver clock tolerance, calculated over 10 bits (considering worst case arbitration scenario), dependence of the network topology, clock frequency tolerance of the sending, and the expected jitter due to injection of R F fields results in typical values of less than 1.4% for the receiver. If the receivers include crystal oscillators, this requirement may be met easily. However, if receivers are not provided with crystals and have to operate with on-chip oscillators, this requirement becomes difficult to achieve, especially over a wide temperature range, as required in automotive applications.

In newly-developed CAN bus concepts, transceivers and small slave devices may need to be able to decode messages that are sent on the CAN bus and perform actions, such waking up other devices, without an crystal oscillator. These devices are very limited by price and power consumption, which make it difficult to achieve the required frequency precision over expected operating temperature ranges and the expected lifetime.

A combination of multi-rate detection and the CAN synchronization mechanism may be used to relax the frequency precision required for the receiver oscillator. This combination offers new unique solutions for low cost CAN receivers.

Figure 3:
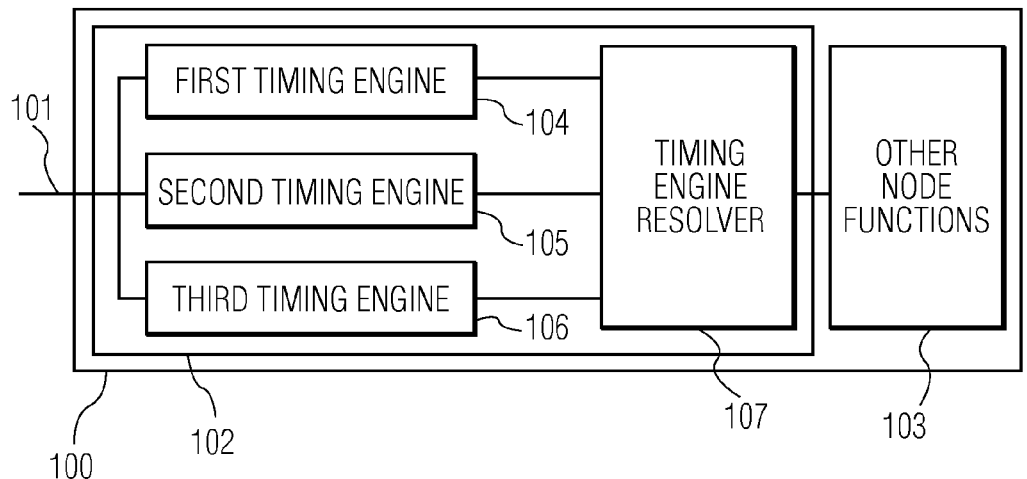
FIG. 3 illustrates an exemplary network device using distributed clock synchronization.

The CAN receiver may be equipped with a 1-bit timing engine, as described in ISO11898-1. FIG. 3 illustrates a network device 100 that uses multiple timing engines that run on slightly different clock rates.

The network device 100 may be connected to a network bus 101. The network device 100 may receive data from other devices on the network from the network bus 101. The network device 100 may include a receiver 102 may receive connected to the network bus 101. The receiver 102 may receive data bits and may detect the data. The receiver 102 may then provide the received data message to other functional devices 103. The other functional devices 103 may include devices that, for example, implement the intended function of the network device.

The receiver 102 may include first, second, and third timing engines 104, 105, 106 and a timing engine resolver 107. Each of the timing engines 104, 105, 106 have slightly different average clock frequencies. Each of the timing engines 104, 105, 106 may receive the received data bits and may, independently and in parallel, process the received data bits. Each of the timing engines 104, 105, 106 may then output an indication that the received data bits were successfully detected as well as a message represented by the received data bits. The timing engine resolver 107 determines which, if any, of the timing engines 104, 105, 106 indicate that it successfully detected, the received data bits, and then provides the message to the other functional devices 103.

The timing engines 104, 105, 106 typically perform a cyclic redundancy check (CRC) on the received data bits, so if the CRC indicates that a valid message has been received the timing engine outputs an indication that a message was successfully received. Because the detection bandwidths of the timing engines overlap, as will be discussed further below, two (or even all) of the timing engines 104, 105, 106 may indicate the successful receipt of a message. In such instances, the timing engine resolver 107 may select one of the two timing engines that indicated successful receipt of a message and may use that timing engine to provide the message to the other functional devices 103. Alternatively, either the timing engines 104, 105, 106 or the timing engine resolver 107 may keep a log of the timing corrections applied by the timing engines 104, 105, 106 on each bit. These timing corrections may then be averaged over a specified period to determine a timing error. Then, if two different timing engines both indicate successful receipt of a message, the timing engine resolver 107 may then select the timing engine with the lowest timing error.

In order to better understand the operation of the receiver 102 and the timing engines 104, 105, 106, a description is given below a how such a receiver 102 may be implemented.

Each of the timing engines 104, 105, 106 have an average NBT that is related to the clock frequency of the timing engine. The average NBT is adapted for the extra engines by adding/subtracting a delay θ for M in N bits. A first timing engine 104 has a clock frequency $f_{1_{nom}}$. In this example, the second timing engine 105 runs with an average NBT of:

$$\overline{NBT}_{(1+\theta)} = \frac{(N-M)*NBT + M*(NBT+\theta)}{N}$$

This leads to a clock frequency of:

$$f_{(1-\delta)} = 1/\overline{NBT}_{(1+\theta)}.$$

The third timing engine 106 runs with an average NBT of:

$$\overline{NBT}_{(1-\theta)} = \frac{(N-M)*NBT + M*(NBT-\theta)}{N}.$$

This leads to a clock frequency of:

$$f_{(1+\delta)} = 1/\overline{NBT}_{(1-\theta)}.$$

Figure 4:
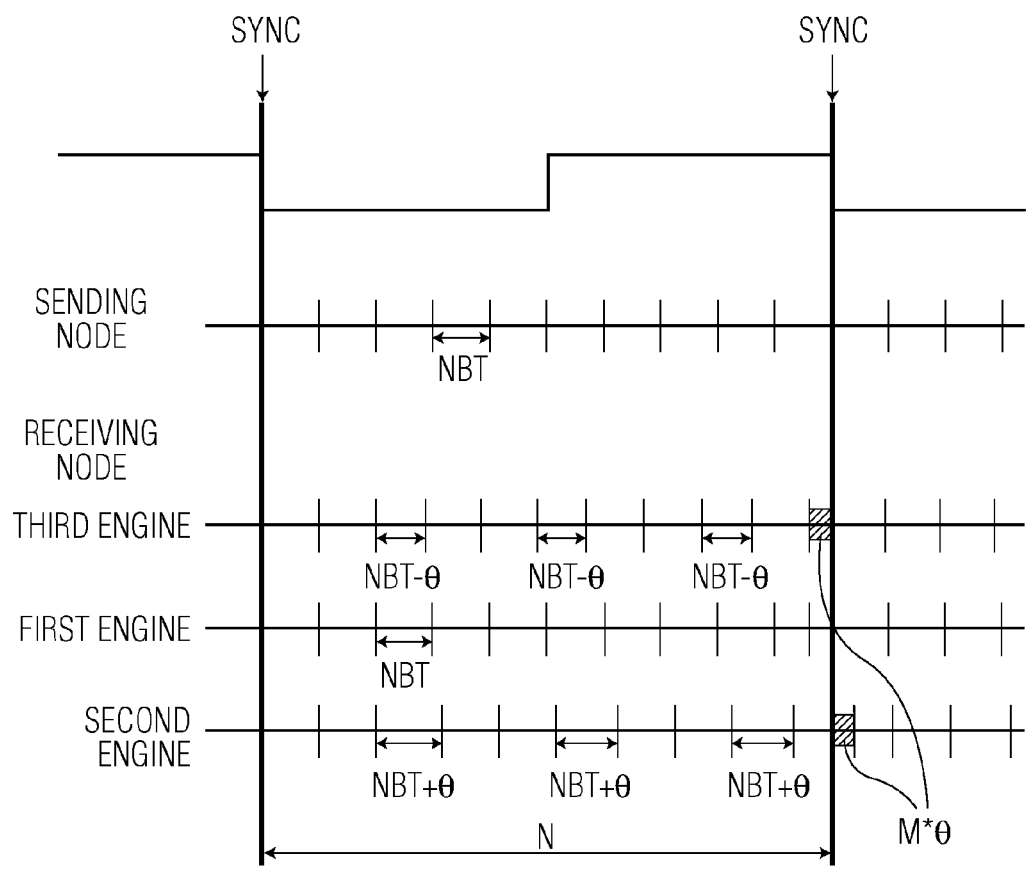
FIG. 4 illustrates an exemplary synchronization timing for the timing engines.

This variation in average frequencies is shown in FIG. 4 that illustrates an exemplary synchronization timing for the timing engines with M=3 and N=10. Note that, for the second engine 105 M, NBT's are reduced by θ so that, at the end of a synch period bits, the total time difference versus the first timing engine 104 is M*θ. In a similar manner, for the third timing engine 106, the difference is increased by M*θ.

At the beginning of each CAN message and on each synchronization event, the time bases of the timing engines 104, 105, 106 are restarted, as illustrated in FIG. 4. Consequently the points in time where reducing/increasing by θ happens have a fixed timing relation to the synch edges. The effect of the extra engines is that the deviation of the internal clock source that can be tolerated is not defined by [$f_{1min} \ldots f_{1max}$], which would be the value for the standard CAN network according to ISO11898-1, but rather by [$f_{(1-\delta)min} \ldots f_{(1+\delta)max}$], where:

$$f_{(1-\delta)min} = f_{1min} - \left(\frac{M}{N} * \frac{\theta}{NBT}\right) * f_{1nom}; \text{ and}$$

$$f_{(1+\delta)max} = f_{1max} + \left(\frac{M}{N} * \frac{\theta}{NBT}\right) * f_{1nom}.$$

Figure 5:
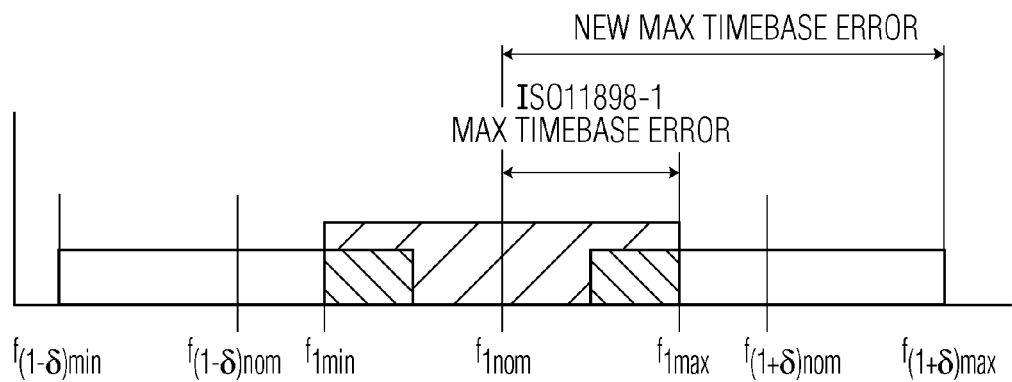
FIG. 5 illustrates an exemplary detection bandwidth for the various timing engines.

FIG. 5 illustrates an exemplary detection bandwidth for the various timing engines (assuming the data includes the worst case timing with respect to the position of the synchronization edges). As can be seen, it shall be assured that there is an overlap of the detection frequency ranges of the engines. This overlap prevents any holes in the detection bandwidth. Further, the overlap of the detection bandwidths of the timing engines 104, 105, 106 should be sufficient to cover variations in timing due to jitter and other causes.

The Time Quanta counters may be directly derived from the internal clock frequency, or equal to the internal clock. For the typical applications, θ=1 Tq.

As discussed above, in order to vary the effective clock frequency of the second and third timing engines 105, 106, M delays θ may be inserted/subtracted each N bits. The allowed clock tolerance for sampling the first bit after resynchronization may be much higher than for the Nth bit. Thus, it is not necessary to insert/subtract Tq's in the first bits after resynchronization, which in turn allows fine tuning of the frequency offset between the timing engines; for example insertion/subtraction could happen in bits 3, 6, and 9, or in bits 3, 4, and 8; the parameter M is 3 (and N=10).

Figure 6:
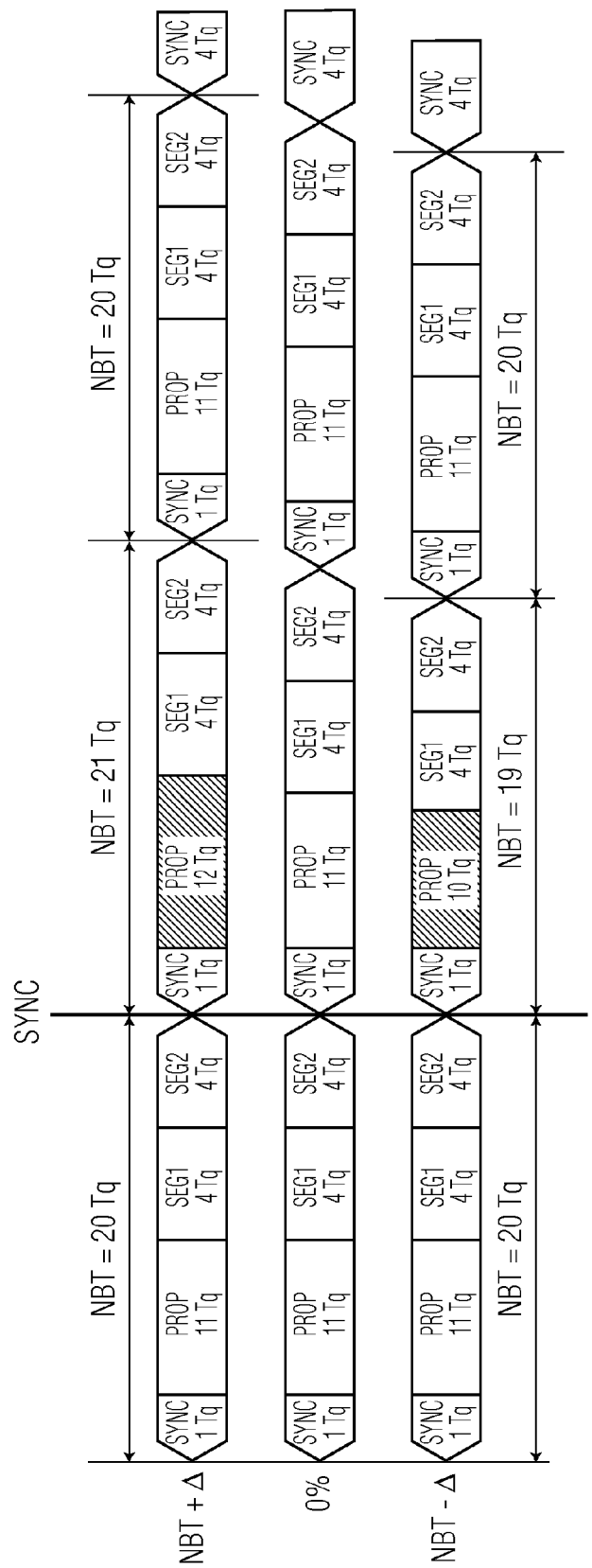
FIG. 6 illustrates an example adaptation of the nominal bit time for the various timing engines.

FIG. 6 illustrates an example adaptation of the nominal bit time for the various timing engines, where θ=1 Tq and NBT=20. As can be seen during the second bit, for the second engine 105 the NBT is increased, therefore, the Prop segment has a length of 12 Tq versus 11 Tq for the first timing engine 104. Similarly, during the second bit, for the third engine 106 the NBT is decreased, therefore the Prop segment has a length of 10 Tq versus 11 Tq for the first timing engine 104. In this example, two later bits will be similarly altered.

Figure 7:
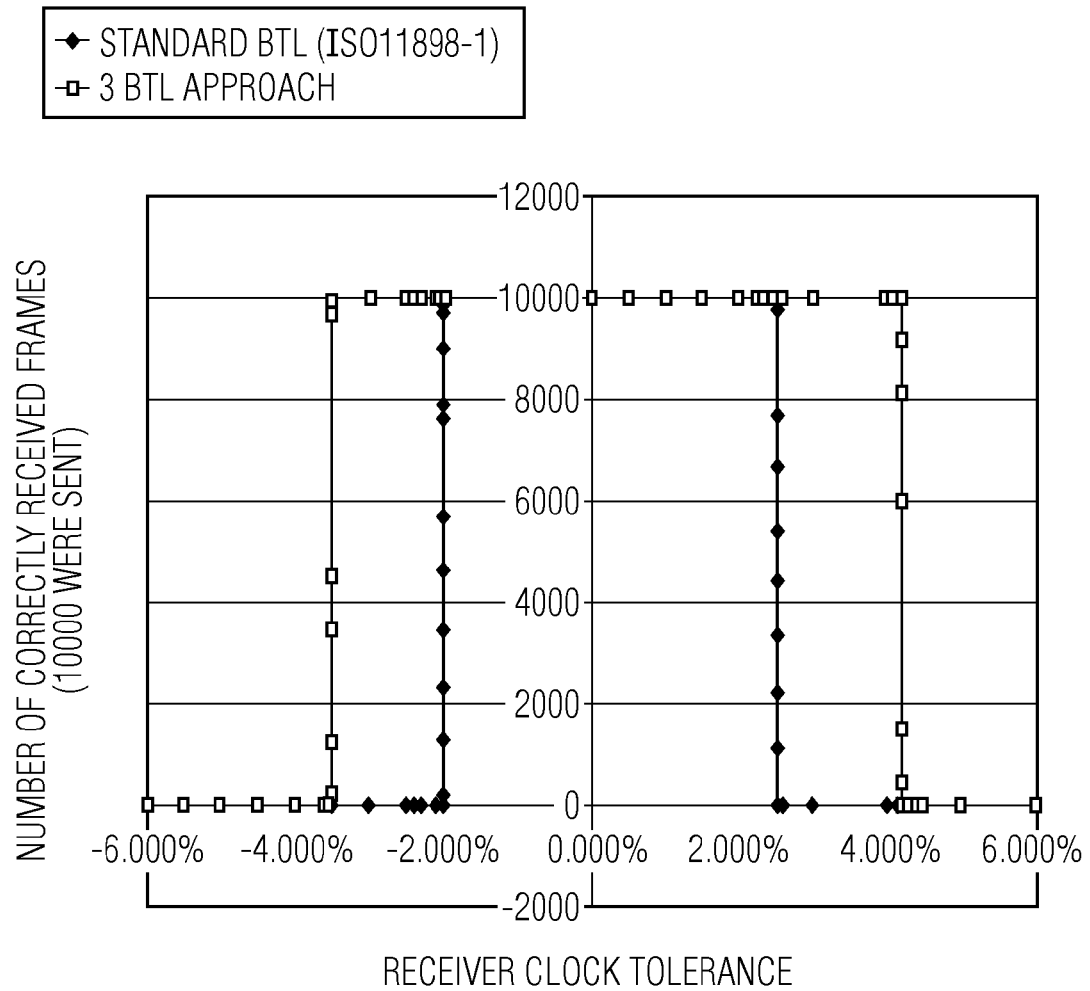
FIG. 7 illustrates test results related to a simulation of the example in FIG. 6.

To determine the performance benefit of the embodiment, an exemplary model was built with the following configuration: N=10, M=3, NBT=20 Tq, θ=1 Tq, which should result in an improvement of approximately 1.5%. The prototype was tested, and the realized detection bandwidth improves as illustrated in FIG. 7. Hence, the clock frequency tolerance also increases by about 1.5%.

It is further noted that in order to further increase the clock frequency tolerance, additional timing engines may be added. Such engines would be configured to have a detection bandwidth that overlaps with the previous engines and that further engines expand the overall detection bandwidth of the receiver. Preferably, such additional engines would be added in pairs to symmetrically increase the detection bandwidth. Also it is noted that only two timing engines could be used, as well, to beneficially increase the detection bandwidth.

While the CAN protocol was used as an example protocol in the detailed description, the invention may be implemented with other similar protocols using distributed clock synchronization, such as, for example, Flexray.

It should be apparent from the foregoing description that various exemplary embodiments of the invention may be implemented in hardware including integrated circuits and/or firmware. Furthermore, various exemplary embodiments may be implemented as instructions stored on a tangible machine-readable storage medium, which may be read and executed by at least one processor to perform the operations described in detail herein. A tangible machine-readable storage medium may include any mechanism for storing information in a form readable by a machine, such as a personal or laptop computer, a server, or other computing device. Thus, a tangible machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A network receiver including a non-transitory computer readable media having a program code for using distributed clock synchronization which when executed by a processor implements:
   a first timing engine that samples bits received by the receiver with a first clock having a first clock frequency ($f_1$) with a first clock frequency tolerance ($\Delta f_1$);
   a second timing engine that samples bits received by the receiver with a second clock having a second clock frequency ($f_2$) with a second clock frequency tolerance ($\Delta f_2$), wherein the second clock frequency is less than the first clock frequency; and a timing engine resolver configured to determine which of the first and second timing engines correctly samples the bits received by the receiver;

wherein $f_1-\Delta f_1 < f_2+\Delta f_2$.

2. The receiver of claim 1, further comprising:
a third timing engine that samples bits received by the receiver with a third clock having a third clock frequency ($f_3$) with a third clock frequency tolerance ($\Delta f_3$), wherein the third clock frequency is greater than the first clock frequency;

wherein $f_3-\Delta f_3 < f_1+\Delta f_1$; and wherein the timing engine resolver is configured to determine which of the first, second, and third timing engines correctly samples the bits received by the receiver.

3. The receiver of claim 2, further comprising:
a fourth timing engine that samples bits received by the receiver with a fourth clock having a fourth clock frequency ($f_4$) with a fourth clock frequency tolerance ($\Delta f_4$), wherein the fourth clock frequency is less than the second clock frequency;
a fifth timing engine that samples bits received by the receiver with a fifth clock having a fifth clock frequency ($f_5$) with a fifth clock frequency tolerance ($\Delta f_5$), where the fifth clock frequency is greater than the third clock frequency;

wherein $f_2-\Delta f_2 < f_4+\Delta f_4$;

wherein $f_5-\Delta f_5 < f_3+\Delta f_3$; and wherein the timing engine resolver is configured to determine which of the first, second, third, fourth, and fifth timing engines correctly samples the bits received by the receiver.

4. The receiver of claim 1, wherein $(f_2+\Delta f_2)-(f_1-\Delta_1) < f_u$ and $(f_1+\Delta f_1)-(f_3-\Delta f_3) < f_u$, wherein $f_u$ is a frequency uncertainty due to timing variations in the bits received by the receiver, wherein $f_3$ is a third clock frequency and wherein $\Delta f_3$ is a third clock frequency tolerance.

5. The receiver of claim 1, wherein each timing engine performs a cyclic redundancy check on the bits received and provides the timing engine resolver an indication as to whether the timing engine correctly sampled the bits received by the receiver.

6. The receiver of claim 5, wherein the timing engine resolver selects a timing engine that passes its cyclic redundancy check and outputs a message received from the selected timing engine.

7. The receiver of claim 6, the timing engine resolver further selects the timing engine that has the lowest timing error.

8. The receiver of claim 1, wherein the receiver communicates using a Controller Area Network protocol.

9. The receiver of claim 1, wherein the receiver communicates using a Flexray protocol.

10. The receiver of claim 1, wherein the receiver is an integrated circuit.

11. A method of receiving bits in a receiver in a network using distributed clock synchronization comprising:
a first sampling step of sampling bits received by the receiver with a first clock having a first clock frequency ($f_1$) with a first clock frequency tolerance ($\Delta f_1$);
a second sampling step of sampling bits received by the receiver with a second clock having a second clock frequency ($f_2$) with a second clock frequency tolerance ($f_2$), wherein the second clock frequency is less than the first clock frequency; and
determining which of the first and the second sampling steps correctly samples the bits received by the receiver;

wherein $f_1-\Delta f_1 < f_2+\Delta f_2$.

12. The method of claim 11, further comprising:
a third sampling step of sampling bits received by the receiver with a third clock having a third clock frequency ($f_3$) with a third clock frequency tolerance ($\Delta f_3$), wherein the third clock frequency is greater than the first clock frequency;

wherein $f_3-\Delta f_3 < f_1+\Delta f_1$ determining which of the first, second, and third sampling steps correctly samples the bits received by the receiver.

13. The method of claim 12, further comprising:
a fourth sampling step of sampling bits received by the receiver with a fourth clock having a fourth clock frequency ($f_4$) with a fourth clock frequency tolerance ($\Delta f_4$), wherein the fourth clock frequency is less than the second clock frequency;
a fifth sampling step of sampling bits received by the receiver with a fifth clock having a fifth clock frequency ($f_5$) with a fifth clock frequency tolerance ($\Delta f_5$), where the fifth clock frequency is greater than the third clock frequency;

wherein $f_2-\Delta f_2 < f_4+\Delta f_4$;

wherein $f_5-\Delta f_5 < f_3+\Delta f_3$; and determining which of the first, second, third, fourth, and fifth sampling steps correctly samples the bits received by the receiver.

14. The method of claim 11, wherein $(f_2+\Delta f_2)-(f_1-\Delta f_1) < f_u$ and $(f_1+\Delta f_1)-(f_3-\Delta f_3) < f_u$, wherein $f_3$ is a third clock frequency, $\Delta f_3$ is a third clock frequency tolerance, and $f_u$ is a frequency uncertainty due to timing variations in the bits received by the receiver.

15. The method of claim 12, further comprising:
performing a cyclic redundancy check on the bits received to determine which of the first, second, and third sampling steps correctly samples the bits received by the receiver.

16. The method of claim 11, wherein the receiver communicates using a Controller Area Network protocol.

17. The method of claim 11, wherein the receiver communicates using a Flexray protocol.

* * * * *